No. 879,116. PATENTED FEB. 11, 1908.
C. H. PELTON.
DRAFT MECHANISM FOR SEEDING MACHINES.
APPLICATION FILED JUNE 24, 1907.
2 SHEETS—SHEET 1.
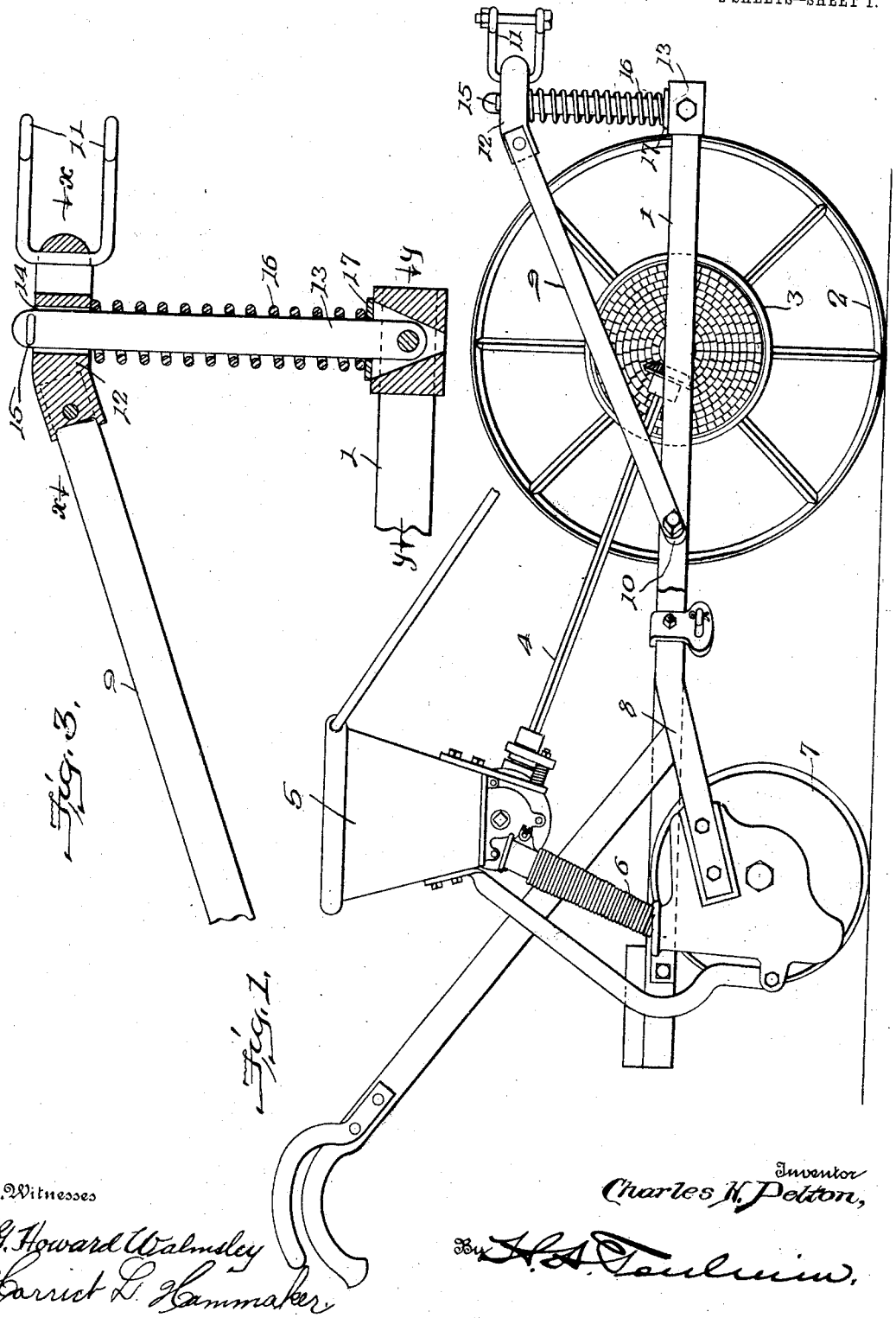
Witnesses
G. Howard Walmsley
Harriet L. Hammaker
Inventor
Charles H. Pelton,
By H. A. Toulmin,
Attorney

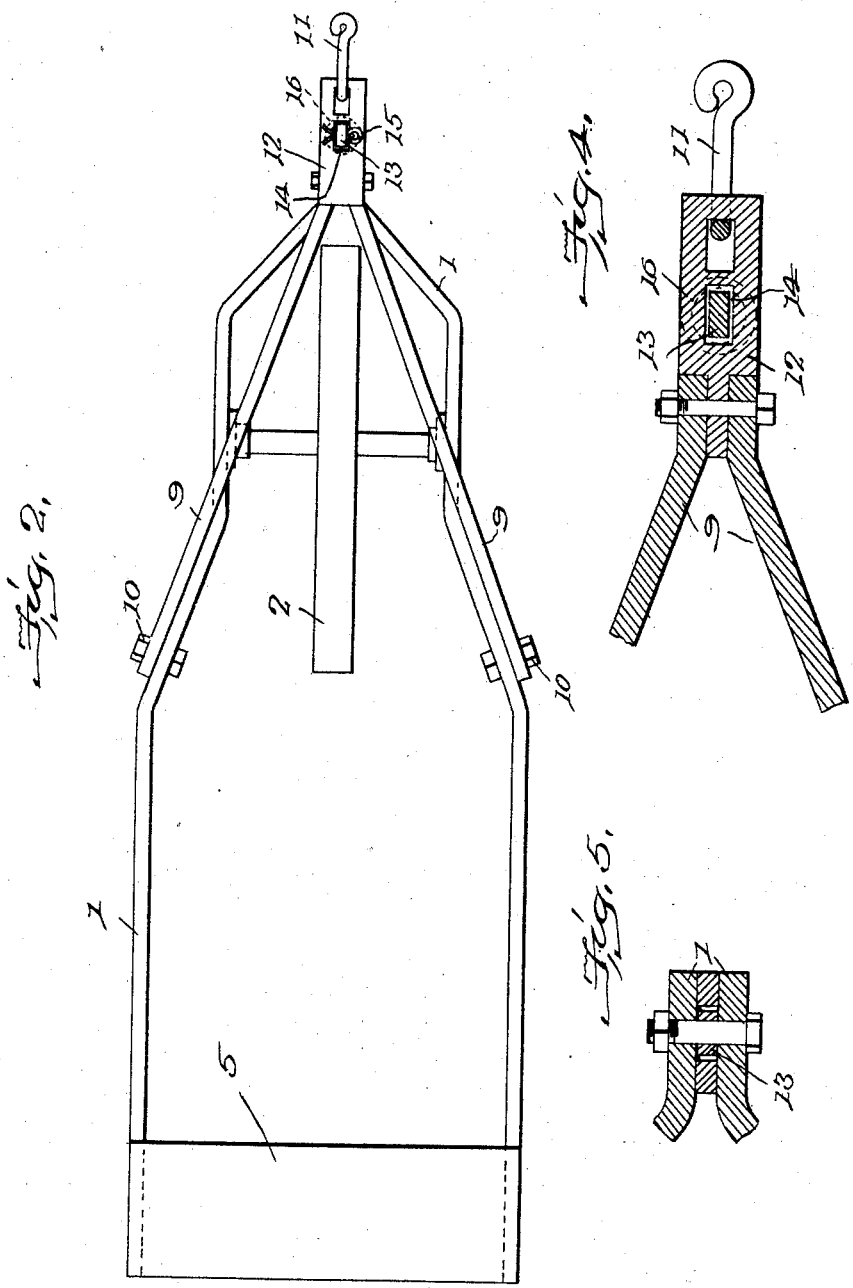

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

DRAFT MECHANISM FOR SEEDING-MACHINES.

No. 879,116.　　　Specification of Letters Patent.　　　Patented Feb. 11, 1908.

Original application filed March 4, 1907, Serial No. 360,458. Divided and this application filed June 24, 1907. Serial No. 380,395.

*To all whom it may concern:*

Be it known that I, CHARLES H. PELTON, a citizen of the United States, residing at Springfield, in the county of Clark and State of Ohio, have invented certain new and useful Improvements in Draft Mechanism for Seeding-Machines, of which the following is a specification, reference being had therein to the accompanying drawings.

The present invention relates to draft mechanism for seeding machines, and the object of the invention is to provide means for maintaining a uniform pressure on the traction wheel, thereby holding the same in constant engagement with the ground and insuring a uniform operation of the seed-feeding mechanism which is driven from the traction wheel.

With this object in view my invention consists in certain novel features of construction and in certain parts and combinations hereinafter to be described, and then more fully pointed out in the claims.

In the accompanying drawings, Figure 1 is a side elevation of a seeding machine embodying my invention; Fig. 2 is a top plan view of the same, omitting the furrow-opening disks and their coöperating parts; Fig. 3 is a sectional detail view taken vertically through the forward portion of the draft mechanism; Fig. 4 is a transverse sectional view taken on the line $x\ x$ of Fig. 3; and Fig. 5 is a transverse sectional view taken on the line $y\ y$ of Fig. 3.

The present application is a division of the application for disk drills, filed by me March 4, 1907, Ser. No. 360,458, and I have shown the invention as applied to a seeding machine such as is shown and described in that application, but obviously, the same could be applied to any machine having the same general characteristics. The seeding machine here shown consists of a main frame 1 having a traction wheel 2 journaled near the forward end thereof and provided with a suitable gear 3 for driving the feed-controlling shaft 4. A seed hopper 5 is mounted above the frame 1 near the rear end thereof and is provided with downwardly extending flexible seed tubes 6, through which the seed is fed from the hopper by a suitable seeding mechanism controlled by the shaft 4 and which conduct the seed to the furrow in the rear of the furrow opening disks 7 which are mounted upon suitable drag bars 8. In a drill of this character the greater portion of the weight rests upon the rear part of the machine immediately above the drills or furrow openers, and, while this is a desirable feature in that it serves to hold the drills firmly in engagement with the ground, it also serves to remove the weight from the traction wheel 2 which is journaled in the forward part of the frame, and, should there be any depressions in the path of said traction wheel, the wheel will not follow the contour of the ground, it being held in a substantially fixed position by the draft mechanism which is secured to the forward end thereof, and, consequently, the wheel will either slow down as the consequence of a light contact with the ground, or, when moved out of contact with the ground altogether, will stop entirely, and, as the feeding mechanism is driven from this wheel, such irregularity of movement affects the feed of the grain and causes the same to be uneven and irregular. To overcome this difficulty, I have provided means for maintaining a uniform pressure upon the traction wheel, thereby holding the same in firm engagement with the surface of the ground at all times. To accomplish this I have provided a draft bar or frame 9, which preferably extends on opposite sides of the traction wheel 2 and is pivoted to the frame 1 in the rear of the axle of said wheel, as shown at 10. The side members of this frame extend forwardly and upwardly to a point in front of the traction wheel 2 and above the frame 1, at which point the frame is provided with a suitable draft hitch 11. The draft frame 9 may be of any suitable construction, but I prefer that herein shown, in which the side members of the frame 9 converge forwardly and upwardly and have secured at their forward ends an apertured block or plate 12, in the forward portion of which a clevis, forming the draft connection 11, is secured, and which forms the forward portion of the frame 9.

A suitable pressure device is interposed between the frame 9 and the main frame 1 and serves to hold the frame 9 normally in an elevated position. This pressure device preferably comprises a resilient body, and, in the form here shown, consists of a rod 13 which is pivotally connected at its lower end to the frame 1 and extends upwardly through a guide opening 14 in the forward portion of the frame 9. The rod 13 is provided at its upper end with a suitable stop, such as a key 15, to prevent its withdrawal therefrom. A spring 16 is coiled about the rod 13 and bears against the lower side of the frame 9 at its upper end and against a suitable stop 17 carried by the rod 13 near its lower end. The height of the forward portion of the frame 9 is such that the draft is exerted in a forward and downward direction, thus tending, under normal conditions, to slightly compress the spring 16, thereby exerting pressure on the frame 1 and maintaining the wheel 2 in firm contact with the ground, and, should there be a depression in the path of the wheel 2, the tension of the spring 16 is such as to cause the wheel to move downward along the surface of the depression and to hold the same in operative engagement therewith, and likewise, if there should be an elevation in the path of the wheel, the spring 16 will be still further compressed to allow the wheel to rise over the same without interfering with the working of the seeding mechanism.

The lower end of the rod 13 is preferably pivoted in the forward end of the frame 1 in such a manner as to allow the same a slight pivotal movement in the direction of the movement of the machine, this pivotal movement being sufficient to compensate for the arc of the circle through which the forward end of the frame 9 moves when the frame is turned about the pivotal center 10 thereof.

The operation of the device will be obvious from the foregoing description and it will be apparent that I have provided a device by means of which the traction wheel is held firmly in engagement with the ground at all times, regardless of any irregularities in the surface of the ground, and thereby tends to actuate the feeding mechanism at a uniform rate, and thus feed the grain evenly into the furrows opened by the disks.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a device of the character described, the combination, with a frame, and a traction wheel mounted therein, of a draft bar pivotally connected to said frame, and resilient means controlled by the draft on said draft bar for exerting pressure on said traction wheel.

2. In a device of the character described, the combination, with a frame, and a traction wheel mounted therein, of a pressure device comprising a draft bar pivotally connected to said frame, and a spring interposed between said draft bar and said frame and adapted to exert pressure on said traction wheel, said pressure being controlled by the draft on said draft bar.

3. In a device of the character described, the combination, with a frame, and a traction wheel journaled therein, of a draft bar pivotally connected to said frame in the rear of the axle of said traction wheel and extending in front of said axle and above said frame, and a spring interposed between said draft bar and said frame.

4. In a device of the character described, the combination, with a frame, and a traction wheel journaled therein, of a draft bar pivotally connected to said frame, a rod secured to said frame at one end and loosely connected at its opposite end to said draft bar, and a spring coiled about said rod between said draft bar and said frame.

5. In a device of the character described, the combination, with a frame, and a traction wheel journaled therein, of a draft bar pivotally connected to said frame and having an aperture near the forward end thereof, a rod connected to said frame in front of the point at which said draft bar is connected thereto and extending through the aperture in said draft bar, and a spring coiled about said rod between said draft bar and said frame.

6. In a device of the character described, the combination, with a main frame, and a traction wheel journaled therein, of a draft frame pivotally connected to said main frame and comprising forwardly and upwardly converging side members having a guideway near their forward ends, a rod connected to said main frame near the forward end thereof and extending through the guideway in said draft frame, and a spring interposed between said draft frame and said main frame.

In testimony whereof I affix my signature in presence of two witnesses.

CHARLES H. PELTON.

Witnesses:
E. O. HAGAN,
EDWARD L. REED.